(12) United States Patent
Leimann

(10) Patent No.: US 9,458,833 B2
(45) Date of Patent: Oct. 4, 2016

(54) METHOD FOR LUBRICATING A GEARBOX FOR A WIND TURBINE

(71) Applicant: ZF Wind Power Antwerpen N.V., Lommel (BE)

(72) Inventor: Dirk Leimann, Edegem (BE)

(73) Assignee: ZF Wind Power Antwerpen N.V., Lommel (BE)

( * ) Notice: Subject to any disclaimer, the term of this patent is extended or adjusted under 35 U.S.C. 154(b) by 0 days.

(21) Appl. No.: 14/402,716

(22) PCT Filed: May 2, 2013

(86) PCT No.: PCT/EP2013/059098
§ 371 (c)(1),
(2) Date: Nov. 21, 2014

(87) PCT Pub. No.: WO2013/182355
PCT Pub. Date: Dec. 12, 2013

(65) Prior Publication Data
US 2015/0139820 A1 May 21, 2015

(30) Foreign Application Priority Data

Jun. 5, 2012 (EP) .................................. 12170773

(51) Int. Cl.
*F03D 11/00* (2006.01)
*F04B 23/08* (2006.01)

(52) U.S. Cl.
CPC ............ *F03D 11/0008* (2013.01); *F04B 23/08* (2013.01); *F05B 2260/98* (2013.01); *F05B 2270/107* (2013.01); *F05B 2270/1071* (2013.01); *Y02E 10/722* (2013.01)

(58) Field of Classification Search
CPC .. F03D 11/0008; F04B 23/08; F16H 61/0031

USPC ......................................................... 184/6.12
See application file for complete search history.

(56) References Cited

U.S. PATENT DOCUMENTS

| | | | | |
|---|---|---|---|---|
| 4,531,485 A | * | 7/1985 | Murther | F01M 1/16 123/196 R |
| 5,199,528 A | * | 4/1993 | Rinaldo | F01M 1/18 137/599.01 |

(Continued)

FOREIGN PATENT DOCUMENTS

| | | |
|---|---|---|
| DE | 10 2008 013 728 A1 | 9/2009 |
| EP | 2 159 472 A1 | 3/2010 |
| WO | 2005/088131 A1 | 9/2005 |

OTHER PUBLICATIONS

International Search Report Corresponding to PCT/EP2013/059098 mailed Aug. 16, 2013.

(Continued)

*Primary Examiner* — Michael Riegelman
(74) *Attorney, Agent, or Firm* — Michael J. Bujold; Davis & Bujold, PLLC

(57) ABSTRACT

A method for lubricating a gearbox of a wind turbine. The gearbox comprises a plurality of gears and shafts supported by bearings of which at least one bearing is a plain bearing. The gearbox furthermore comprises a lubrication system with both a mechanical pump and an electrical pump for feeding the gears and bearings with lubricant, wherein a difference between a volume capacity of the mechanical and electrical pump is a maximum 40%. The method comprises the step of controlling at least one valve, during start-up of the gearbox, and feeding lubricant to the bearings via the electrical pump; feeding lubricant to the bearings and the gears, during normal operation of the gearbox, via the electrical pump and the mechanical pump; and feeding lubricant only the bearings, during the absence of electrical power supply, via the mechanical pump.

9 Claims, 7 Drawing Sheets

(56) References Cited

U.S. PATENT DOCUMENTS

| | | | | |
|---|---|---|---|---|
| 5,769,182 | A * | 6/1998 | Parenteau | F16N 7/40 184/104.1 |
| 6,739,305 | B2 * | 5/2004 | Takahara | F01M 1/02 123/196 R |
| 6,941,922 | B2 * | 9/2005 | Williams | F01M 1/02 123/196 R |
| 8,522,924 | B2 * | 9/2013 | Komizo | F16H 61/0031 184/6.28 |
| 2006/0042700 | A1 * | 3/2006 | Yoshida | F04B 17/05 137/565.33 |
| 2007/0098567 | A1 * | 5/2007 | Johnson | F04C 11/00 417/199.1 |
| 2011/0012365 | A1 | 1/2011 | Becker | |
| 2011/0204633 | A1 | 8/2011 | Takayanagi | |
| 2011/0303491 | A1 * | 12/2011 | Jenkins | F16C 17/24 184/7.4 |
| 2012/0070280 | A1 * | 3/2012 | Wadehn | F03D 7/0212 416/1 |
| 2012/0211307 | A1 * | 8/2012 | Nielsen | F03D 11/0008 184/4 |
| 2013/0288843 | A1 * | 10/2013 | Baum | F01M 5/001 475/160 |

OTHER PUBLICATIONS

Written Opinion Corresponding to PCT/EP2013/059098 mailed Aug. 16, 2013.

* cited by examiner

METHOD FOR LUBRICATING A GEARBOX FOR A WIND TURBINE

This application is a National Stage completion of PCT/EP2013/059098 filed May 2, 2013, which claims priority from European patent application serial no. 12170773.1 filed Jun. 5, 2012.

FIELD OF THE INVENTION

The present invention relates to a method for lubricating a gearbox for a wind turbine. More particular, the present invention relates to a method for lubricating a gearbox for a wind turbine in emergency situations such as for example grid loss or failure of the electrical pump.

BACKGROUND OF THE INVENTION

Lubrication of rotating parts such as gears and bearings in gearboxes for wind turbines during operation of the wind turbine is very important. No or not sufficient provision of lubricant to these parts can lead to damages and to failure of such parts. Especially bearings supporting gears and shafts in the gearbox, and more particularly plain bearings, are very sensitive to good lubrication and need at all times sufficiently be provided with lubricant in order not to fail.

During normal operation, in known wind turbine and gearbox designs, lubricant is continuously fed to the rotating parts by means of an electrical pump and usually this is sufficient for feeding the right amount of lubricant to the rotating parts. However, in case of emergency situations like, for example, grid loss or failure of the electrical pump, the lubricant feeding may not be sufficient anymore for the rotating parts in the gearbox, and especially the bearings, to continue working properly.

SUMMARY OF THE INVENTION

The present invention provides a method for lubricating a gearbox of a wind turbine. The gearbox comprises a plurality of gears and shafts supported by bearings of which at least one is a plain bearing. The gearbox furthermore comprises a lubrication system with a mechanical pump and an electrical pump for feeding the gears and bearings with lubricant. A difference between volume capacity of the mechanical and electrical pump is maximum 40%. The method comprises controlling at least one valve for
   during start-up of the gearbox feeding lubricant to the bearings by means of the electrical pump,
   during normal operation of the gearbox feeding lubricant to the bearings and the gears by means of the electrical pump and the mechanical pump, and
   during absence of electrical power supply feeding lubricant only to the bearings by means of the mechanical pump.

An advantage of a method according to embodiments of the invention is that whenever the electrical pump fails to work properly, e.g. by loss grid or simply by a failure of the electrical pump, sufficient lubricant is provided to the bearings, and more particularly to the at least one plain bearing, for preventing them from being damaged because of a too low amount of lubricant.

According to embodiments of the invention, the method may furthermore comprise, during start-up of the gearbox, feeding lubricant to the gears by means of the mechanical pump.

According to embodiments of the invention, the lubrication system may comprise a plurality of valves and the method may comprise controlling a plurality of valves.

According to embodiments of the invention, controlling the at least one valve may be electrically driven.

According to other embodiments of the invention, controlling the at least one valve may be pressure-driven.

According to further embodiments of the invention, controlling the at least one valve may be electrical fail safe driven.

According to still further embodiments of the invention and in case the lubrication system comprises a plurality of valves, controlling the valves may partly be pressure-driven and partly be electrically driven.

BRIEF DESCRIPTION OF THE DRAWINGS

It has to be noted that same reference signs in the different figures refer to same, similar or analogous elements.

DETAILED DESCRIPTION OF THE PREFERRED EMBODIMENTS

Figure 1:
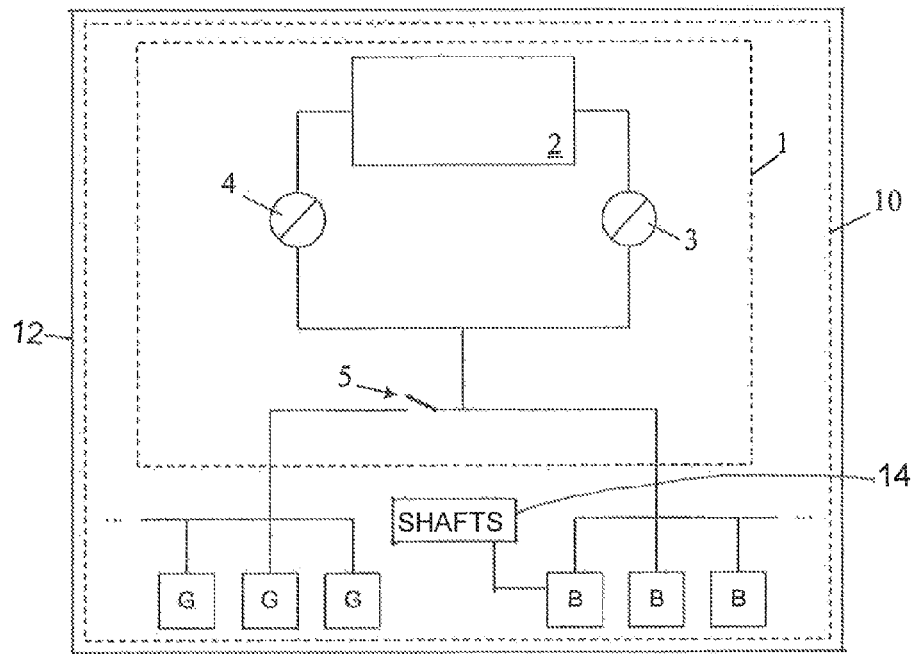
FIG. 1 and FIG. 2 schematically illustrate examples of a lubrication system according to embodiments of the invention.

In the description different embodiments will be used to describe the invention. Therefore reference will be made to different drawings. It has to be understood that these drawings are intended to be non-limiting, the invention is only limited by the claims. The drawings are thus for illustrative purposes, the size of some of the elements in the drawings may be exaggerated for clarity purposes.

The term "comprising" is not to be interpreted as limiting the invention in any way. The term "comprising", used in the claims, is not intended to be restricted to what means is described thereafter, it does not exclude other elements, parts or steps.

The term "connected" as used in the claims and in the description has not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B.

Not all embodiments of the invention comprise all features of the invention. In the following description and claims, any of the claimed embodiments can be used in any combination.

The present invention provides a method for lubricating a gearbox of a wind turbine. The gearbox comprises a plurality of gears and shafts supported by bearings of which at least one is a plain bearing, and a lubrication system with a mechanical pump and an electrical pump for feeding the gears and bearings with lubricant wherein a difference between volume capacity of the mechanical pump and the electrical pump is maximum 40%. The method comprises controlling at least one valves for:

during start-up of the wind turbine gearbox feeding lubricant to the bearings by means of the electrical pump, during normal operation of the wind turbine gearbox feeding lubricant to the bearings and the gears by means of the electrical pump and the mechanical pump, and during absence of electrical power supply feeding lubricant only the bearings by means of the mechanical pump.

An advantage of a method according to embodiments of the invention is that whenever there is a problem with the electrical pump, e.g. when there is a grid loss or when the electrical pump fails, the bearings in the gearbox are still provided with enough lubricant so as to provide them from being damaged.

The present invention will hereinafter be described by means of different embodiments. It has to be understood that these embodiments are only for the ease of understanding the invention and are not intended to limit the invention in any way.

Figure 2:
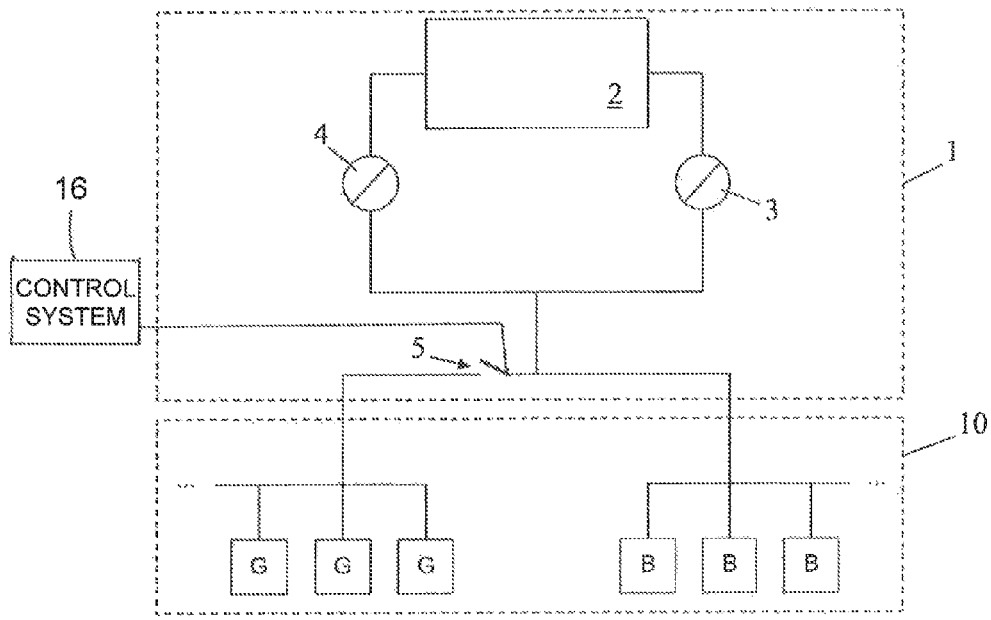

FIG. 1 and FIG. 2 illustrate a lubrication system 1 for a gearbox 10 of a wind turbine 12 (diagrammatically show in FIG. 1) according to embodiments of the present invention. The lubrication system 1 comprises a lubricant reservoir 2, a mechanical pump 3 and an electrical pump 4. A difference between volume capacity of the mechanical pump 3 and the electrical pump 4 is maximum 40%. This means that when the sum of the volume capacities of the mechanical pump 3 and the electrical pump 4 is, for example, 100 L, then the volume capacity of the mechanical pump 3 may minimum be 30 L and maximum 70 L and the volume capacity of the electrical pump 4 may then respectively be maximum 70 L and minimum 30 L. Preferably, the volume capacity of the mechanical pump 3 and the electrical pump 4 may be equal and may, for example, be 50 L. The lubricant reservoir 2 comprises lubricant for lubricating gears G and bearings B which support shafts 14 in the gearbox 10 and diagrammatically shown in FIG. 1. According to embodiments of the invention, at least one of the bearings B in the gearbox 10 may be a plain bearing. According to other embodiments, more than one of the bearings B in the gearbox 10 may be plain bearings and according to still further embodiments of the invention, all bearings B in the gearbox 10 may be plain bearings.

According to embodiments of the invention and as illustrated in FIG. 1, the lubrication system 1 may be located inside the gearbox 10. According to other embodiments, however, and as illustrated in FIG. 2, the lubrication system 1 may also be located outside the gearbox 10, or in other words may be an external lubricant reservoir 2.

In the example given in FIG. 1 and FIG. 2, the lubrication system furthermore comprises one valve 5 for controlling the flow of the lubricant and a control system 16 (diagrammatically shown in FIG. 2) for controlling this valve 5.

Figure 3:
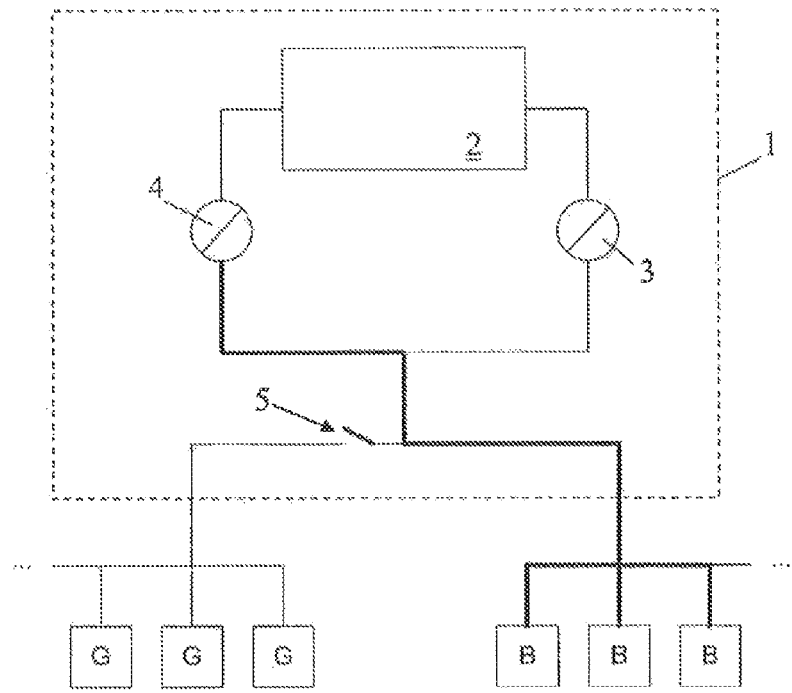
FIG. 3 to FIG. 5 schematically illustrates steps of a method for lubricating a gearbox for a wind turbine according to embodiments of the invention.
Figure 12:
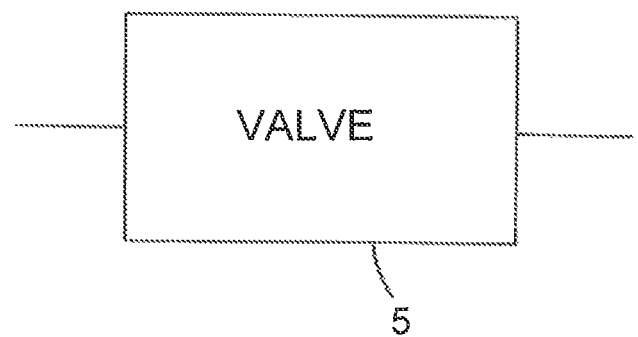
FIG. 12 schematically illustrates a valve for controlling flow of lubricant.

During start-up of the wind turbine gearbox, the electrical pump 4 feeds lubricant to the bearings B (see FIG. 3). During this step, according to embodiments of the invention, the mechanical pump 3 is not working. The valve 5 (diagrammatically shown in FIG. 12) is controlled in such a way that only lubricant is provided to the bearings B. Flow of lubricant is indicated by the bold line in FIG. 3. According to embodiments of the invention, controlling the valve 5 may be pressure-driven. In that case, because only the electrical pump is providing lubricant, the pressure is not high enough to open the valve 5 and thus lubricant only flows to the bearings B. According to other embodiments of the invention, controlling the valve 5 may be electrically driven. In that case, the valve 5 is controlled to stay closed such that lubricant can only flow to the bearings B and not to the gears G. According to still further embodiments of the invention, controlling the valve 5 may be electrical fail safe driven. This means that, whenever there is no electricity, the valve 5 will take the right position so as only to allow flow of lubricant to the bearings B and not to the gears G.

Figure 4:
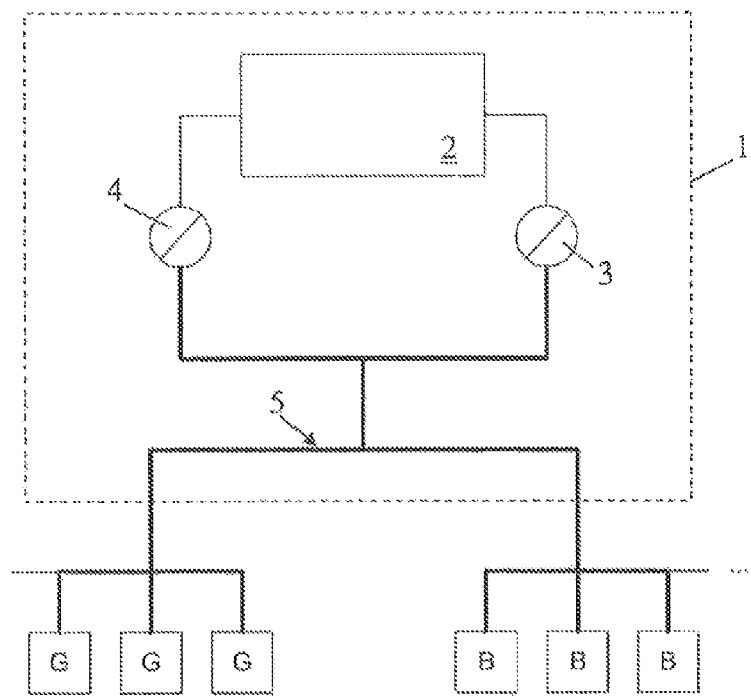

During normal operation, lubricant is provided to both the gears G and the bearings B by both the mechanical pump 3 and the electrical pump 4 (see FIG. 4). Therefore, the control system controls the valve 5 so as to open and to allow flow of lubricant also to the gears 5. Flow of lubricant is again illustrated by the bold line in FIG. 4. As already mentioned above, controlling the valve 5 may be pressure-driven, electrically driven or electrical fail safe driven.

Figure 5:
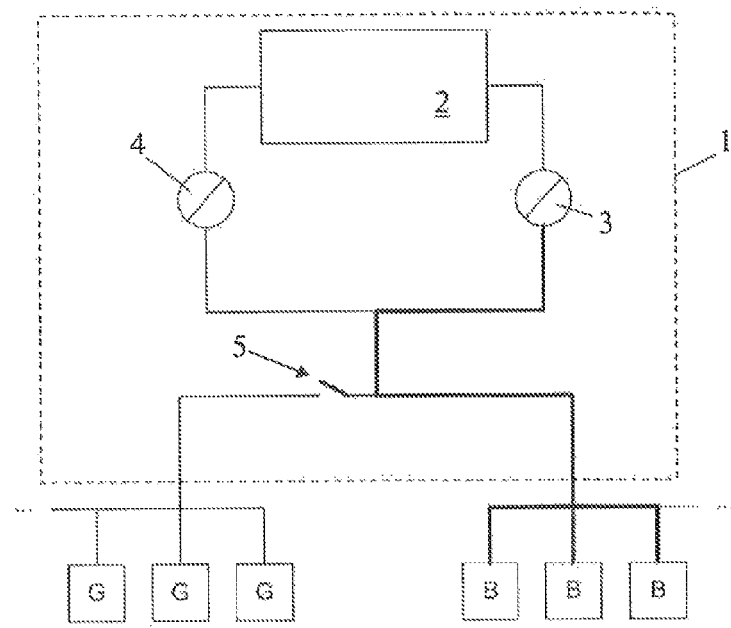

When, during normal operation, a grid loss occurs or for some other reason the electrical pump 4 fails to work properly, it will take some time, e.g. e few seconds, for the turbine and thus also the gearbox to stand still. In this case, according to embodiments of the invention, the control system drives the valve 5 to close such as to allow flow of lubricant from the lubricant reservoir 2 through the mechanical pump 3 to the bearings B and not to the gears G (indicated by the bold line in FIG. 5).

Figure 6:
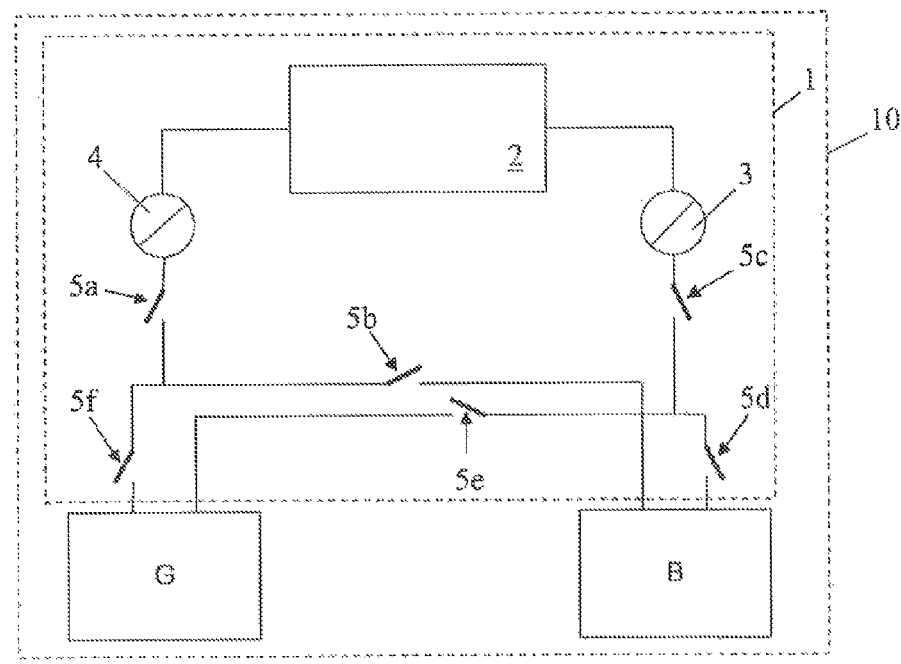
FIG. 6 and FIG. 7 schematically illustrate examples of a lubrication system according to further embodiments of the invention.
Figure 7:
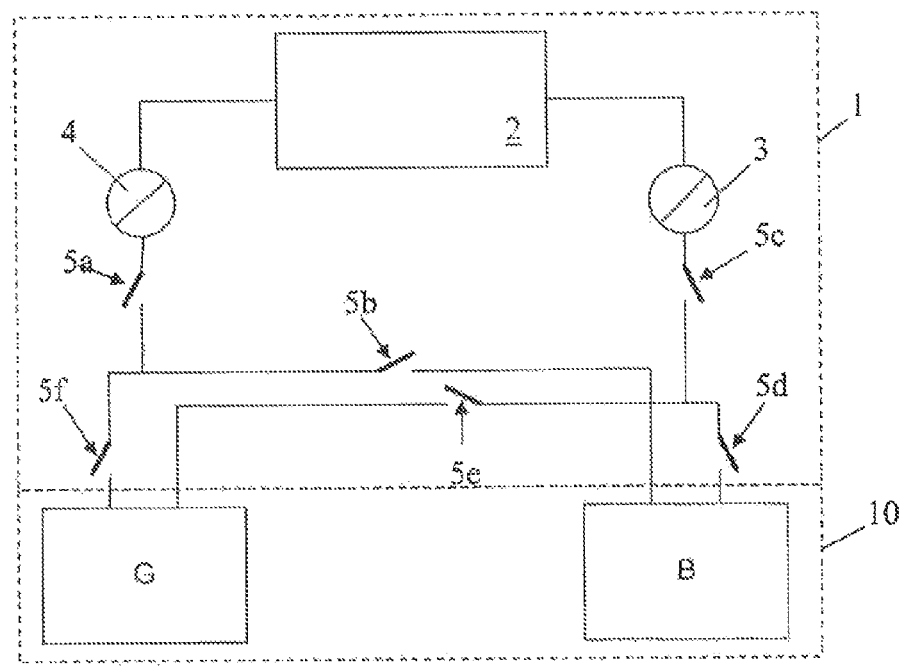

FIG. 6 and FIG. 7 illustrate another embodiment of the present invention. According to this embodiment, the lubrication system 1 is similar to the one described in the previous embodiment but now comprises a plurality of valves 5a to 5f instead of only one valve 5 for controlling the flow of the lubricant. Similar as for the above embodiment, the lubrication system 1 may be located inside the gearbox 10 (see FIG. 6) or may be located outside the gearbox 10 (see FIG. 7).

Figure 8:
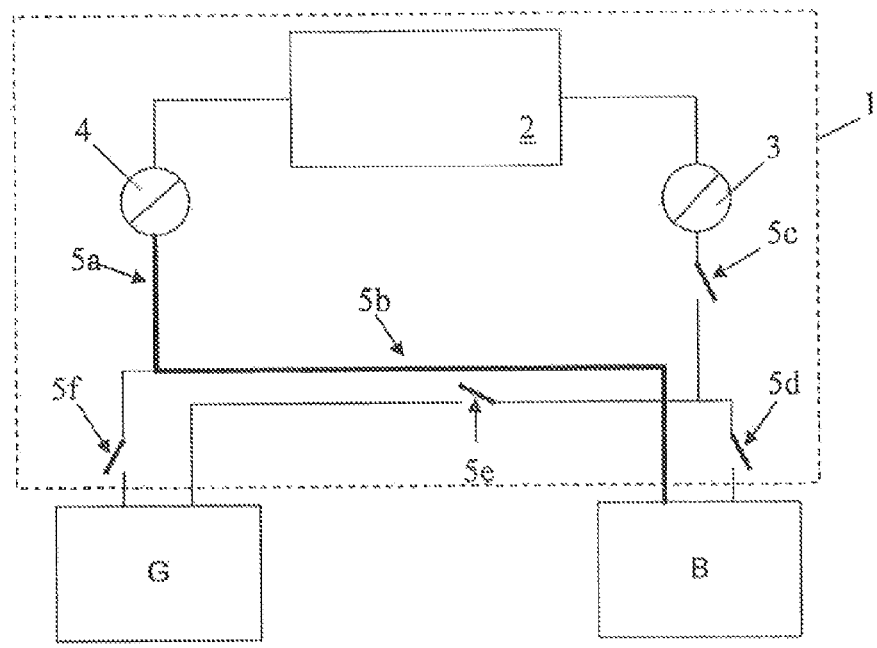
FIG. 8 to FIG. 11 schematically illustrates steps of a method for lubricating a gearbox for a wind turbine according to further embodiments of the invention.
Figure 9:
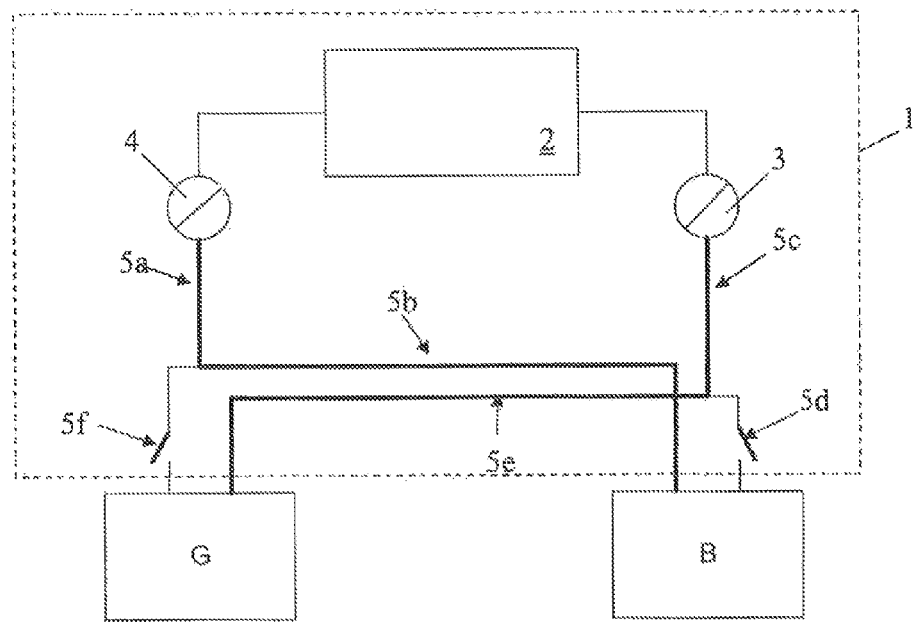

During start-up of the wind turbine gearbox 10, according to embodiments of the invention, the electrical pump 4 provides lubricant to the bearings B (see FIG. 8). In this step, the control system controls the valves 5a to 5f such that valves 5a and 5b open to avow lubricant to flow from the lubricant reservoir 2 towards the bearings B through the electrical pump 4 (lubricant flow is indicated by the bold line in FIG. 8). According to other embodiments, during start-up of the wind turbine gearbox 10, lubricant may furthermore be provided to the gears G by means of the mechanical pump 3. This is illustrated in FIG. 9. In this case, the control system controls the valves 5a to 5f such that valves 5a to 5c and 5e are open so as to allow lubricant flow to the bearings B and the gears G and that valves 5d and 5f are closed.

Figure 10:
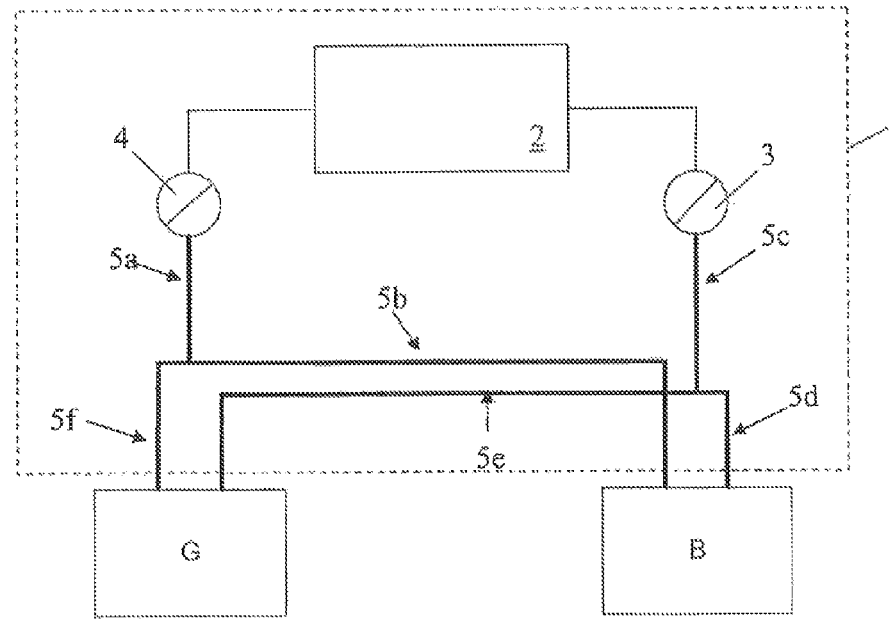

During normal operation, lubricant is provided to both the gears G and the bearings B. Therefore, the control system controls the valves 5a to 5f such that these valves 5a to 5f are all opened such that lubricant can flow from the lubricant reservoir 2 through the mechanical pump 3 and the electrical pump 4 to the gears G and the bearings B. This is illustrated in FIG. 10 in which the flow of lubricant is indicated by bold line. As long as the wind turbine gearbox operates in a normal way these valves 5a to 5f stay open such that at all times the gears G and the bearings B are provided with sufficient lubricant in order to work properly.

Figure 11:
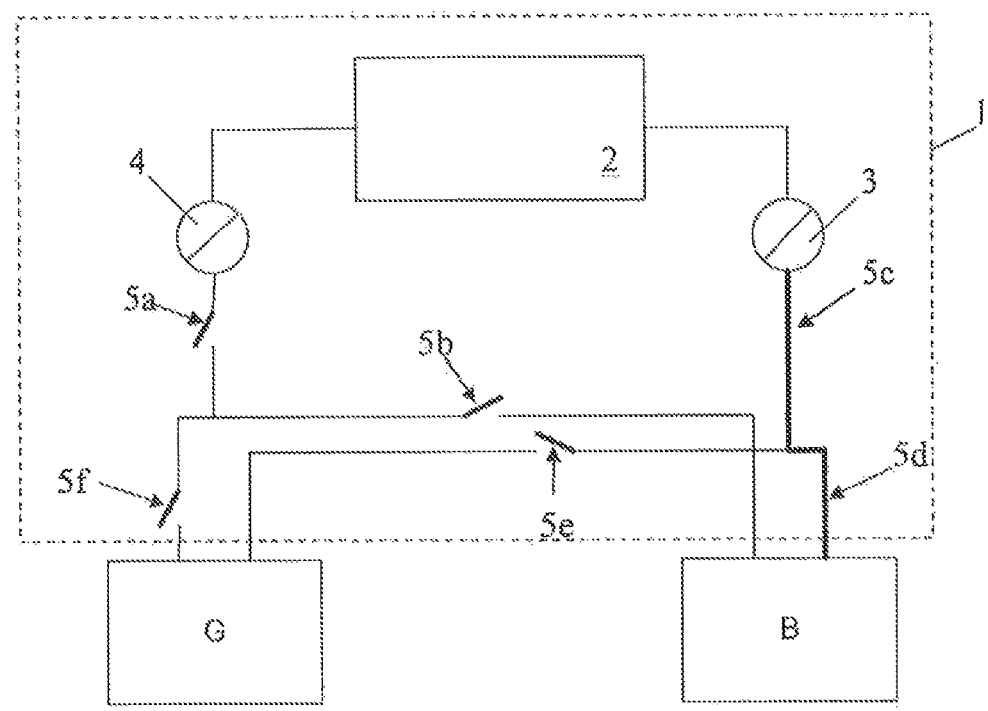

When, during normal operation, a grid loss occurs or for some other reason the electrical pump 4 fails to work properly, it will take some time, e.g. e few seconds, for the turbine and thus also the gearbox 10 to stand still. In this case, according to embodiments of the invention, the control system drives the valves 5a to 5f such that valves 5c and 5d are opened to allow flow of lubricant from the lubricant reservoir 2 through the mechanical pump 3 to the bearings B and that the other valves 5a, 5b, 5e and 5f stay closed (see FIG. 11). This is because it is very important that the bearings B, and especially the at least one plain bearing B, are provided with sufficient lubricant until the wind turbine and thus also the gearbox 10 stand still or, in other words, do no longer rotate. If this would not be the case, or in other words, if no sufficient lubrication would be provided to the bearings B while the gearbox 10 was still working, this could severely damage the bearings B.

According to embodiments of the invention, controlling the valves 5a to 5f may be electrically driven, electrical fail safe driven or electrically and pressure-driven.

Hereinafter, the case of the valves 5a to 5f being electrically and pressure-driven will be described in more detail. According to these embodiments, during start-up of the wind turbine, the electrical pump 4 is working and allows lubricant to flow towards valve 5a. Because of the pressure caused by the lubricant flow, the valve 5a will open and further allow flow of the lubricant. Similar, because of the lubricant pressure valve 5b will close and allow lubricant to flow to the bearings B. Valve 5f is thereby electrically controlled such that it stays closed and substantially no lubricant flows to the gears G at that time. During normal operation of the gearbox 10 both the mechanical pump 3 and the electrical pump 4 work and allow lubricant to flow from the lubricant reservoir 2 through respectively valves 5a and 5c. Because of the pressure exerted by the lubricant, these valves 5a and 5c will open and allow further flow of the lubricant. Similarly, because of the lubricant flow, respectively valves 5b and 5f and valves 5d and 5e will open and allow lubricant to be provided to respectively the gears G and the bearings B. Summarized, during normal operation the lubricant pressure will be high enough to make all the valves 5a to 5f open such that the lubricant can flow towards the gears G and the bearings B. When the electrical pump 4 stops working, only the mechanical pump 3 will be left to provide lubricant to components of the gearbox 10. In that case, lubricant pressure will cause valve 5c to stay open and to allow further flow of lubricant. Similarly, valve 5d will also stay open to allow lubricant to be provided to the bearings B. Valve 5e will then electrically be controlled so as to close to not further allow lubricant flow to the gears G. Valves 5a, 5b and 5f will close because of a too low pressure of the lubricant.

The invention claimed is:

1. A method for lubricating a gearbox of a wind turbine in which the gearbox comprises a plurality of gears and shafts supported by bearings where at least one bearing is a plain bearing, and a lubrication system with a mechanical pump and an electrical pump for feeding the gears and the bearings with lubricant, and at least one valve which is arranged in the lubrication system downstream from the mechanical and the electrical pumps, wherein a difference between a volume capacity of the mechanical pump and the electrical pump is a maximum 40%, the method comprising the steps of:

actuating the at least one valve, with a control system, to a first position to prevent a flow of the lubricant to the gears and to direct the flow of the lubricant from the electric pump to the bearings, during start-up of the gearbox, actuating the at least one valve, with the control system, to a second position to direct the flow of the lubricant from the electric pump to the bearings and the gears and to direct the flow of the lubricant from the mechanical pump to the bearings and the gears, during normal operation of the gearbox, and actuating the at least one valve, with the control system, to the first position to prevent the flow of the lubricant to the gears and to direct the flow of the lubricant from the mechanical pump to the bearings, during absence of electrical power supply.

2. The method according to claim 1, further comprising the step of, during start-up of the gearbox, feeding lubricant to the gears via the mechanical pump.

3. The method according to claim 1, further comprising the step of controlling a plurality of valves.

4. The method according to claim 1, further comprising the step of controlling a plurality of valves is electrically driven.

5. The method according to claim 1, further comprising the step of controlling a plurality of valves is pressure-driven.

6. The method according to claim 1, further comprising the step of controlling a plurality of valves is electrical fail safe driven.

7. The method according to claim 1, further comprising the step of controlling a plurality of valves is partly pressure-driven and partly electrically driven.

8. The method according to claim 1, further comprising the at least one valve arranged in the lubrication system comprises only one valve.

9. A method for lubricating a wind turbine gearbox, the gearbox comprises a plurality of gears and a plurality of shafts supported by bearings where at least one of the bearings is a plain bearing, and a lubrication system comprising a mechanical pump and an electrical pump for supplying lubricant to the plurality of gears and the bearings, and a valve which is arranged in the lubrication system downstream with respect to flow of the lubricant from the mechanical and the electrical pumps to the gears and the bearings, and a difference in a volume capacity between the mechanical pump and the electrical pump is a maximum 40%, the method comprising:

closing the valve, with a control system, such that the flow of the lubrication from the electrical pump is prevented from flowing to the gears and is conducted to the bearings, during start-up of the gearbox, when the flow of lubrication to the bearings is only supplied by the electrical pump, and;

opening the valve, with the control system, to direct the flow of the lubricant from the electrical pump to the bearings and the gears, during normal operation of the gearbox, and directing the flow of the lubricant from the mechanical pump to the bearing and the gears during the normal operation of the gearbox, and closing the valve, with the control system, to direct the flow of the lubricant from the mechanical ump to only the bearings and preventing the flow of the lubrication to the gears, during an absence of electrical power supply, when only the mechanical pump is supplying the flow of the lubrication.

* * * * *